G. W. MITTELSTAEDT.
FLY ESCAPE SCREEN.
APPLICATION FILED MAR. 13, 1919.
1,305,147.
Patented May 27, 1919.
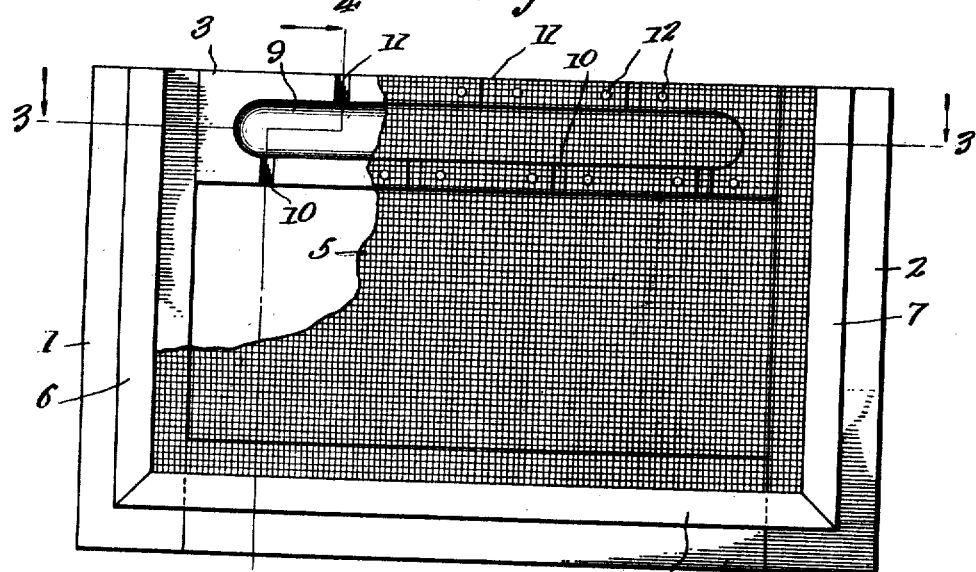
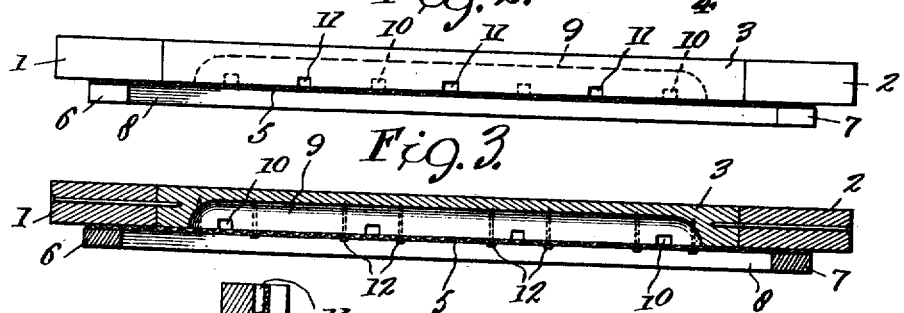
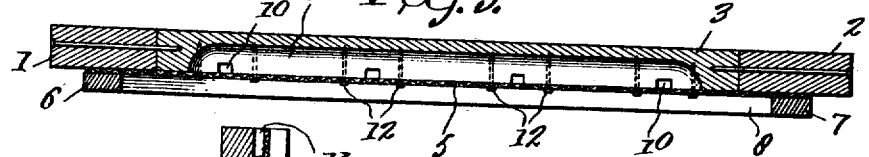
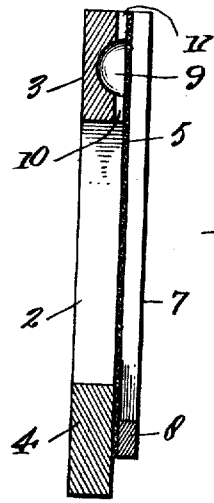
Inventor:
G. W. Mittelstaedt
by Wilkinson & Giusta
Attorneys.

UNITED STATES PATENT OFFICE.

GEORGE W. MITTELSTAEDT, OF MORTON GROVE, ILLINOIS.

FLY-ESCAPE SCREEN.

1,305,147.     Specification of Letters Patent.     Patented May 27, 1919.

Application filed March 13, 1919. Serial No. 282,281.

*To all whom it may concern:*

Be it known that I, GEORGE W. MITTELSTAEDT, a citizen of the United States, residing at Morton Grove, in the county of Cook and State of Illinois, have invented certain new and useful Improvements in Fly-Escape Screens; and I do hereby declare the following to be a full, clear, and exact description of the invention, such as will enable others skilled in the art to which it appertains to make and use the same.

The present invention relates to improvements in fly escape screens, and it is intended to permit and induce the escape of flies from the room where the screen is located by taking advantage of the well known habits of these insects to walk upwardly on the screen and to be attracted toward the light.

It is an object of the present invention to produce a screen of the above referred to character that will be exceedingly simple in construction, while at the same time providing for the effectual and rapid escape of the insects.

The invention will be more fully understood after reference to the accompanying drawings, in which like parts are indicated by similar reference symbols throughout the several views, and in which:—

Figure 1 is a front elevational view of a fly escape screen constructed in accordance with the present invention, and with part of the screen broken away.

Fig. 2 is a top plan view of the same.

Fig. 3 is a horizontal sectional view taken on the line 3—3 in Fig. 1; and

Fig. 4 is a vertical sectional view taken on the line 4—4 also in Fig. 1.

Referring now in detail to the drawings, the screen frame is composed of the vertical side stiles 1 and 2 and the upper and lower rails 3 and 4, respectively, which connect with the stiles 1 and 2; the arrangement providing a rectangular open framework.

Across this open rectangular framework is stretched the screening or mesh 5 and vertical strips 6 and 7 and a lower horizontal strip 8 are placed over the edges of the mesh 5 in order to secure the screening to the framework, to conceal the edges and present a neat appearance of the screen.

In accordance with the present invention the top rail 3 is formed with a cavity 9 of the semi-cylindrical shape shown, or other configuration, and this cavity 9 provides a trap or prison into which the insects may walk through openings 10, leading from the room to such cavity 9.

These openings 10 are provided in a suitable number in the lower part of the top rail 3 and are inclosed at their outer sides by the mesh 5 so that the insects may have an uninterrupted path up the mesh 5 through the openings 10 and into the trap or prison 9.

The insects will, of course, be attracted by the light above the openings 10 which will cause them to walk upwardly over the mesh screen 5 and through the openings into the trap.

Now I further preferably form in the upper portion of the top rail 3 above the cavity 9 a second series of spaced openings 11, which are staggered with respect to the aforesaid openings 10, and lead from the cavity 9 through the top of the screen and to the outdoors, so that the flies may escape to the exterior of the room or building.

In like manner these openings 11 are inclosed on their outer sides by the mesh 5, and the light above same will attract the flies to walk upwardly therethrough and make their escape.

The arrangement of the staggered openings 10 and 11 will prevent flies or other insects on the exterior finding their way into the room through these passages, by reason of the fact that in looking down through the openings 11 light is cut off because of the presence of the imperforate portion of the top rail 3 below the cavity 9, and therefore the insects will not naturally be attracted to enter through these openings 11.

No corresponding top strip is provided, such as the side strips 6 and 7 and the lower strip 8, as such strip would have a tendency to cut off or decrease the amount of light which is a necessary feature in attracting the insects to walk upwardly into the trap and make their exit through the top openings 11; but instead of using such a strip at the top I simply secure the mesh 5 directly to the exterior face of the top rail 3, as, for instance, by numerous small nails 12 preferably placed in pairs at opposite sides of each of the openings 10 and 11, and close to said openings so as to hold the mesh securely in place at these points.

The openings 10 and 11 are made of small size so that the mesh 5 will not be unduly unsupported at these points and will not have a tendency to buckle into such openings; but, of course, said openings will be of sufficient diameter to readily acommodate flies or other insects ordinarily infesting habitable buildings.

From the foregoing description taken in connection with the accompanying drawings, it will be appreciated that I have provided an exceedingly simple screen in which the major portion of the screen conforms substantially to present type screens of standard construction, and is modified only in the matter of the top rail into which trap and fly escape openings are made, and in accordance with my invention it will be an easy matter to rearrange old screens by providing them with new top rails constructed in accordance with the invention and thereby equip them to carry out the purposes herein intended.

It will be obvious that various modifications might be made in the herein described construction, and in the combination and arrangement of parts which could be used without departing from the spirit of my invention; and I do not wish to limit myself to such details except as particularly pointed out in the claims.

Having thus described my invention what I claim and desire to secure by Letters Patent of the United States is:—

1. A fly escape screen comprising a framework including a top rail formed with a cavity therein opening on the exterior and formed intermediate the upper and lower edges thereof, said top rail being also provided with two series of openings made above and below said cavity in the upper and lower parts of said top rail, said openings being made through the outside face of the screen, and a suitable mesh material secured to said frame and to the exterior face of said top rail, the mesh material inclosing on the exterior said cavity and openings, substantially as described.

2. A fly escape screen of the character described, including a frame having a top rail provided with an elongated cavity opening out on the exterior face of said rail and made intermediate the upper and lower parts of the rail, said cavity providing a trap or prison for insects, said top rail also having a series of fly exit openings in the lower part thereof placing the cavity in communication with the room, said openings being made through the exterior face of the top rail, said top rail being also provided with a second series of fly exit openings made in the upper part of said top rail and arranged in staggered relation to the openings of said first-named series, the last named openings placing the trap or prison in communication with the outdoors and being made through the exterior face of said top rail, and a mesh material secured to said framework and to the exterior face of said top rail whereby to close the cavity and both of said series of openings, substantially as described.

3. A fly escape screen comprising vertical side stiles, horizontal top and bottom rails connecting said vertical stiles, said top rail being formed with a substantially semi-cylindrical cavity therein opening on the outside face and with numerous small openings arranged in staggered relation in the upper and lower parts of said top rail, said openings being made through the exterior face of the top rail and leading, respectively, to the room and to the outdoors, a mesh material stretched over and secured to said framework, vertical strips concealing the side edges of said mesh material and secured to said vertical stiles, a lower strip concealing the bottom edge of said mesh material and secured to the lower rail, the top of the mesh material being left free of strips, and fastening means for securing the mesh material directly to said top rail, said fastening means being arranged in pairs close to and at opposite sides of said openings, substantially as described.

GEORGE W. MITTELSTAEDT.

Copies of this patent may be obtained for five cents each, by addressing the "Commissioner of Patents, Washington, D. C."